July 15, 1969

H. REES 3,454,991

MOLDING MACHINE

Filed Nov. 29, 1966

Herbert Rees
INVENTOR.

BY
Karl F. Ross
Attorney

July 15, 1969 H. REES 3,454,991
MOLDING MACHINE
Filed Nov. 29, 1966 8 Sheets-Sheet 7

INVENTOR:
Herbert Rees
BY
Karl F. Ross
Attorney

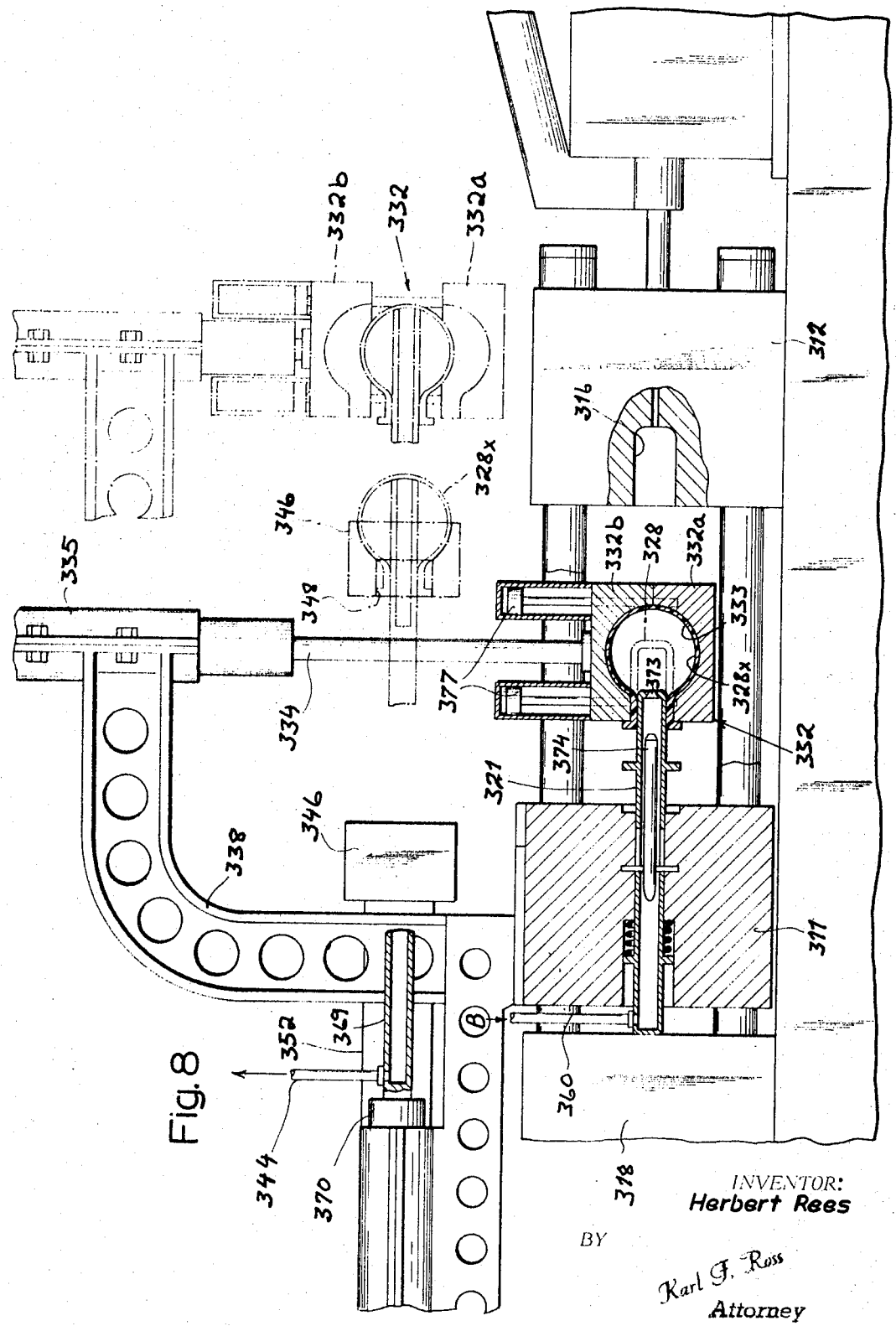

3,454,991
MOLDING MACHINE
Herbert Rees, Toronto, Ontario, Canada, assignor to
Husky Manufacturing and Tool Works Ltd.,
Toronto, Ontario, Canada, a corporation of Canada
Filed Nov. 29, 1966, Ser. No. 597,641
Claims priority, application Great Britain, Nov. 30, 1965,
50,820/65
Int. Cl. B29c 7/00, 17/07
U.S. Cl. 18—30                                            11 Claims

ABSTRACT OF THE DISCLOSURE

An injection-molding machine wherein a take-off member carried on a movable mold portion is interposable between that mold portion and its mate in the open-mold position to receive the molded articles and to remove them from the molding zone, preferably in an upward direction, to a remote location where a transfer member (preferably also carried on the movable mold portion) picks up the article or articles from the take-off member and delivers them to a discharge point. The take-off member may have seats for two or more parts of a multipart article which are successively collected by the transfer member so that the latter may also serve as a means for assembling these parts to form the composite article. Finally, the take-off member may be designed as a blow mold in which the articles removed from the injection mold are further shaped by expansion.

---

The present invention relates to a molding machine of the type described in my prior U.S. Patent No. 3,254,371 wherein a split mold, formed with one or more cavities, includes a stationary or substantially fixed first portion and a movable second portion reciprocable between an open and a closed position.

In such machines, the articles molded in a single injection cycle are discharged from the movable mold portion as the latter approaches its withdrawn position, generally with the aid of one or more ejector rods or pins which enter each cavity of the receding mold portion and dislodge the respective workpiece therefrom. The workpiece then falls between the mold portions, again approaching each other during the next closure stroke, into a suitable receptacle disposed underneath.

With molding machines operating at ever-increasing speeds, such an ejection system is no longer satisfactory since the discharged workpiece may not drop rapidly enough to clear the path of the reciprocating mold portion. Attempts have therefore been made to provide means for positively removing all the workpieces from the mold in its open state so as to prevent them from being crushed between the mold portions and from interfering with the reclosing of the mold. Prior systems of this type, however, could not always be fully synchronized with the mold cycle and, for this reason, were not wholly dependable in their operation. Furthermore, even when the workpieces were positively removed, they were generally dropped randomly into a receptacle and were required to be handled again for stacking.

The general object of this invention is to provide an improved workpiece-removal system which, by being positively coupled with the mold drive, ensures timely separation of every workpiece from the mold and enables unobstructed mold closure on the next forward stroke; an important corollary object is the orderly stacking and sorting of the workpieces automatically as they are removed from the mold.

An injection-molding machine according to the invention, having two relatively movable mold portions, comprises a take-off member interposable between these mold portions in an open condition thereof to receive one or more freshly molded articles and to entrain same from the region of the mold portions preparatorily to reclosure and performance of a new molding operation, and mechanism operative in a retracted position of the take-off member for removing the entrained article or articles therefrom.

According to a more specific feature of my invention, the mechanism for removing the entrained articles comprises a transfer member alignable with the retracted take-off member for receiving the entrained articles and, after moving from its aligned position into a discharge position, releasing these articles to a receptacle therefor. Both the take-off member and the transfer member may be supported on an axially reciprocable mold portion for displacement therewith; on the opposite, stationary (or only limitedly movable) mold portion there may be mounted a fluid-operated (pneumatic or hydraulic) plunger, or a set of such plungers, forming part of the aforementioned removal mechanism. This latter arrangement is particularly advantageous when the finished article is to consist of two or more distinct parts separately molded in respective cavities for subsequent assembly, e.g. when these parts are to be of different color; in that case, the take-off member should have as many seats as there are cavities and the transfer member should be successively positionable in line with these seats so as to receive first one of the complementary parts and then another such part, the plunger serving to force the last-mentioned part into engagement with the first part. To this end, the seats of the take-off member (and therefore the corresponding cavities of the injection mold) should be staggered in the direction of relative motion of the two members, thus horizontally if, by preference, the take-off member moves generally upwardly from the region of the mold portions to its retracted position while the transfer member moves substantially horizontally on the level of that retracted position.

Another advantageous feature, useful in the molding of hollow articles, is the design of the take-off member as a blow mold. In that case, only a preformed article is initially introduced into the take-off member immediately after the injection-molding step, preferably with the aid of a tubular pusher element which is connected to a source of fluid under pressure for admitting such fluid into the preformed article and expanding same against the walls of the blow mold. The pusher element, whether or not it also serves as a fluid nozzle, may be displaceably mounted on the axially reciprocable mold portion so as to be engaged by a stationary abutment during the molding stroke whereby the take-off member, receding with that mold portion, overtakes the molded or preformed article even as this article is detached from the mold portion.

Advantageously, in order to facilitate checking on the correct engagement of a workpiece with the take-off member, the latter may be equipped with conduit means leading to a source of low pressure for the creation of suction between the workpiece and its seat, the collapse of a partial vacuum adjacent the workpiece indicating that the molded article is either defective (i.e. not leak-proof) or absent. Naturally, the location of the clearance constituting the site of this partial vacuum will depend on the shape of the molded article since it can only be bounded by a solid portion of that article. A pressure-sensitive detector connected with the suction line may, if the vacuum fails, give an alarm to alert an operator and/or to arrest the machine, thereby eliminating the risk of damage to a costly mold due to the presence of remnants of an imperfectly ejected workpiece in one of its cavities.

In accordance with a specific feature of my invention, a blower or pump used to generate the monitoring suction may also serve as a source of high-pressure fluid (e.g. air) adapted to dislodge the workpiece from its seat in the take-off member after the latter has been withdrawn from the mold path.

In the accompanying drawing:

FIG. 8 is a side-elevational view (parts broken away) of the machine shown in FIG. 7.

Figure 1:
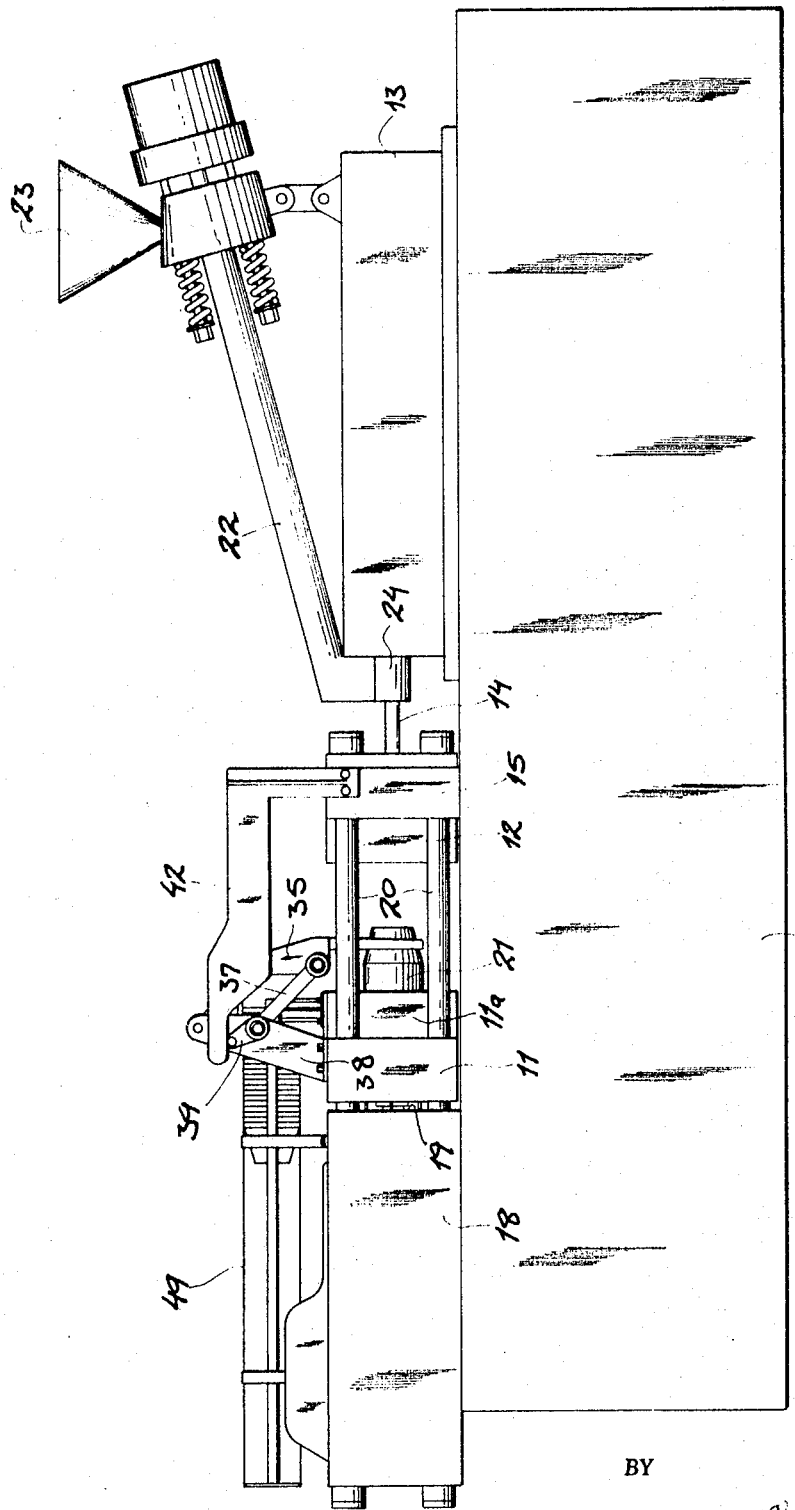
FIG. 1 is a side-elevational view of a molding machine similar to that disclosed in my aforementioned U.S. Patent No. 3,254,371, modified in accordance with an embodiment of this invention.
Figure 3:
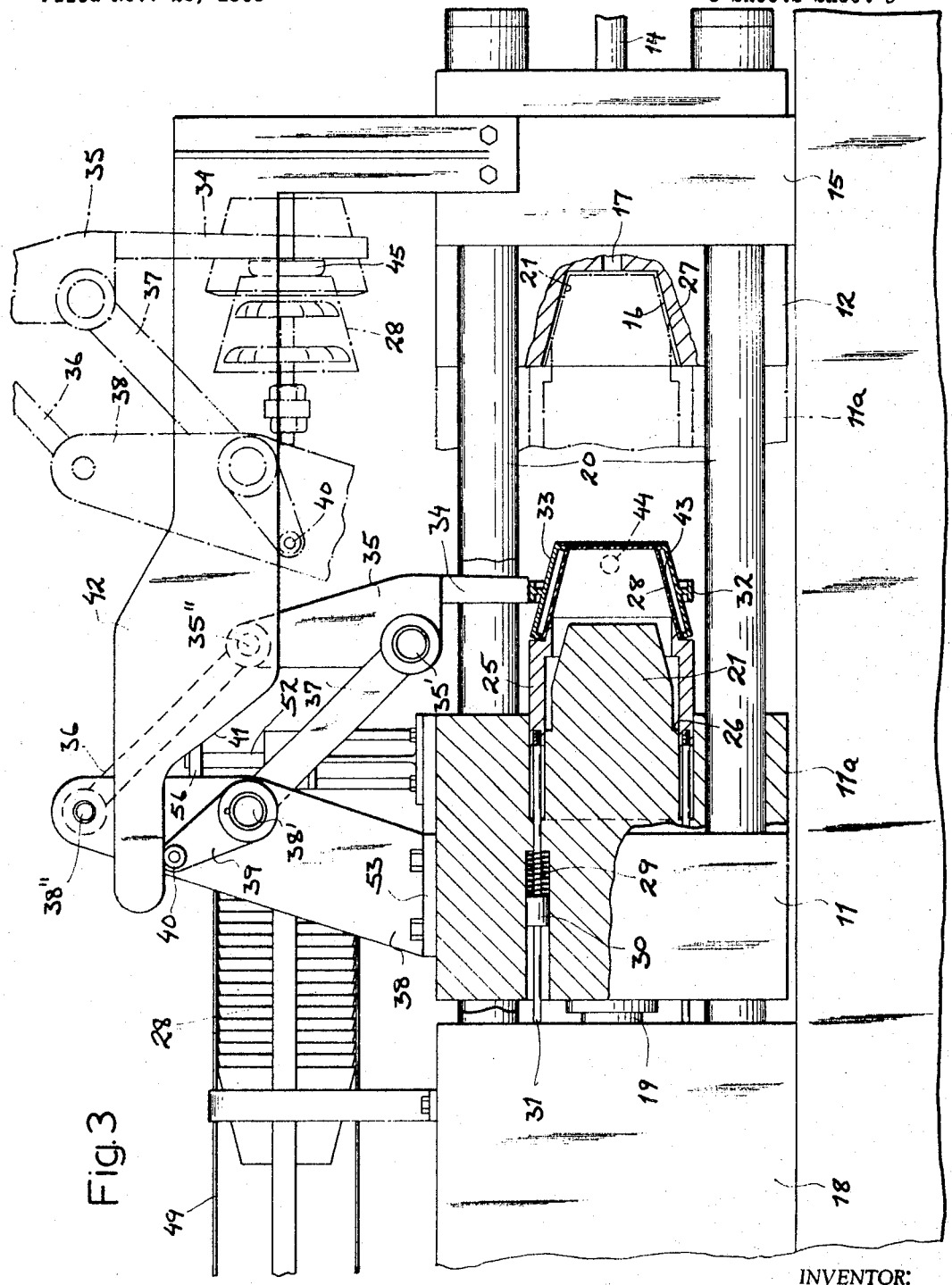
FIG. 3 is a side-elevational view, partly in section, of the elements shown in FIG. 2.

The machine shown in FIG. 1 comprises a base 10 which contains the various motors and controls necessary for operating the principal parts of the machine, i.e. its movable mold portion 11, co-operating with a stationary mold portion 12, and its injection piston (not shown) within a cylinder housing 13 which communicates via a channel 14 with an injection chamber within a fixed backing plate 15; mold portion 12, attached to plate 15, has a recess 16 communicating with the injection chamber via an orifice 17 (FIG. 3). The housing 18 for the mold drive contains a ram 19 reciprocably lodged therein, this ram being rigid with mold portion 11. The latter rides on horizontal rails or tie rods 20 and has an extension 11a from which a core 21 projects toward the recess 16 of mold portion 12.

A cylinder 22 houses a feed screw (not shown) which masticates and liquefies plastic material, supplied in granular form to a hopper 23, prior to delivering it to a precompression chamber 24 from which it is subsequently discharged via the main compression chamber and orifice 17 into the recess 16 by the reciprocating injection piston whose own drive, coordinated with that of ram 19, also controls the feed screw in cylinder 22.

The mold core 21 cooperates with a surrounding stepped sleeve 25 which fits onto a shoulder 26 of the core when the latter, together with mold portion 11, 11a, is moved out of its extreme left-hand position (shown in full lines in FIGS. 1–3) toward its other limiting position (dot-dash lines, FIG. 3) in which the mold is closed. The frustoconical outer periphery of sleeve 25 complements that of core 21 and defines with it a beveled surface spaced from that of recess 16 by a narrow annular clearance 27 which corresponds to the shape of a workpiece 28 to be molded. Sleeve 25 is urged into engagement with shoulder 26 by coil springs 29 (only one shown) bearing upon collars 30 of ejector rods 31, threadedly connected with the sleeve, which are slidably guided in mold portion 11. In the terminal phase of the withdrawal stroke of mold portion 11, rod 31 strikes the front wall of drive housing 18 and arrests the sleeve 25 which thus lifts the cup-shaped article 28 off its core 21. Suitable means known per se, such as a parting agent lining the recess 16 and/or burrs or other frangible formations on the workpiece 28 cooperating with the surface of the core or the sleeve, may be used to ensure invariable entrainment of the workpiece by the core 21 and mold portion 11.

Figure 2:
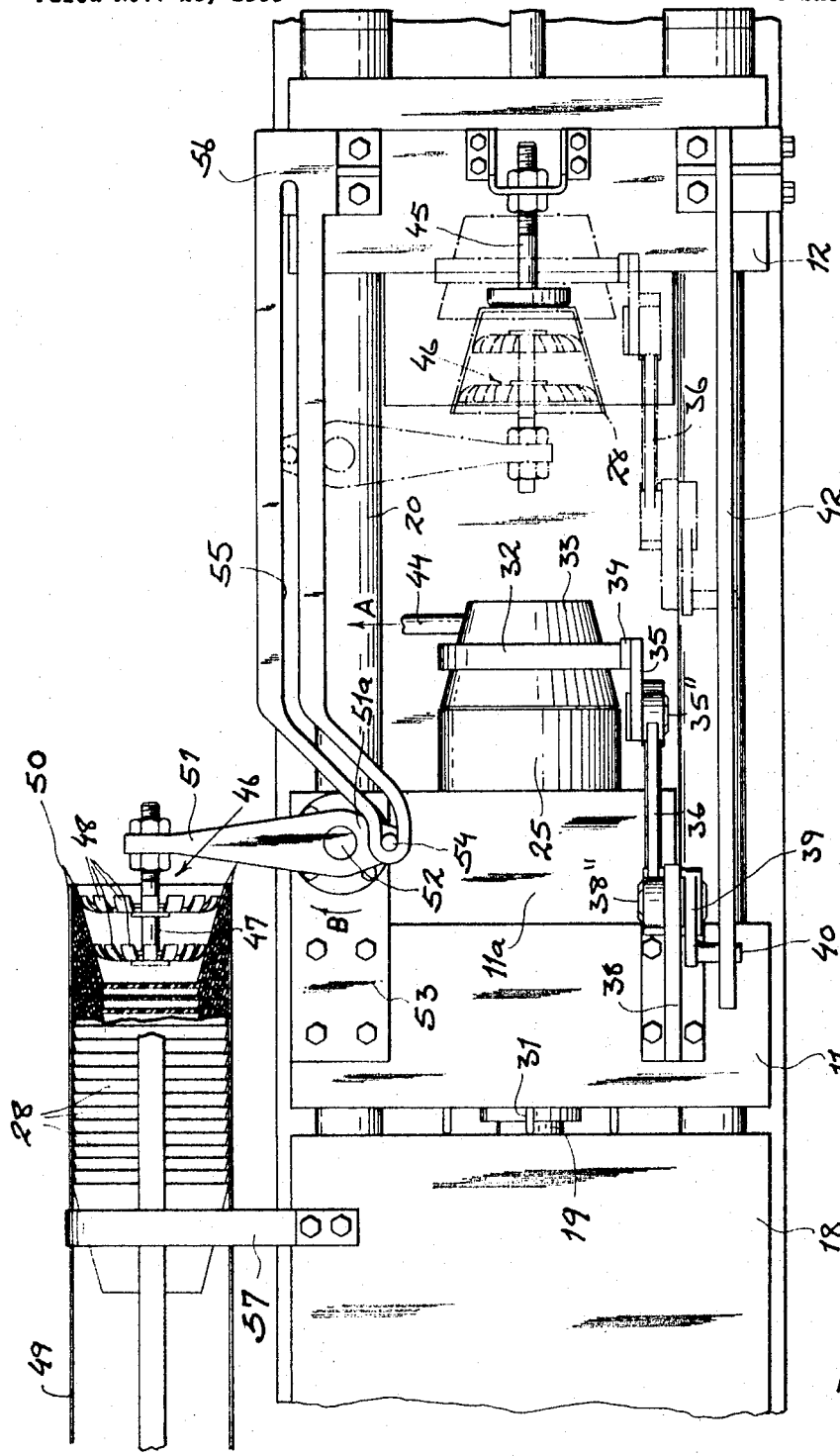
FIG. 2 is a fragmentary top view, drawn to a larger scale, of the system shown in FIG. 1.

As the mold portion 11 approaches its outermost position at the extreme left in FIGS. 1–3, a take-off plate 32 swings down in front of this mold portion and follows the core 21 in its leftward movement with the same terminal speed, thereby maintaining a frustoconical collar 33 aligned with the core 21 so that this collar intercepts the workpiece 28 as it is dislodged from the core. This is best illustrated in FIG. 3 which also shows how the plate 32 is suspended by an arm 34 from a lever 35 forming part of a parallelogrammatic linkage. The other members of this linkage are a pair of parallel rods 36, 37 and a standard 38, mounted on mold portion 11, with the rods 36 and 37 articulated to members 35 and 38 at 35', 35" and 38', 38", respectively. Rod 37 is rigid with a lug 39 terminating in a roller 40 which moves along a camming surface 41 of an elongated stationary bar 42 mounted on backing plate 15.

The shape of camming surface 41 is so chosen that, as the mold portion 11 moves forward, roller 40 travels horizontally along a short initial section and is then deflected downwardly by a sloping section of that surface, coming to rest against another horizontal portion as illustrated in dot-dash lines at the right of FIG. 3. This downward camming of roller 40, against the weight of members 32–37 which may be supplemented by a spring force, swings the lug 39 and, with it, the links 36 and 37 counterclockwise through an arc of substantially 90°, thereby elevating the take-off plate 32 out of the path of mold portion 11 into a position above mold portion 12. The reverse motion, of course, takes place upon the subsequent opening stroke of the mold.

Collar 33 of plate 32 is peripherally recessed to form an annular vacuum chamber 43 with the cup-shaped article 28 seated therein. This vacuum chamber communicates via a flexible conduit 44 with a source of low pressure, symbolized in FIG. 2 by an arrow A, which may be the intake port of a blower or pump as described hereinafter with reference to FIG. 4. This source becomes operative only during the closure stroke of the mold portion 11 to create a partial vacuum in the annular space 43, thereby holding the article 28 securely in position within the seat-forming collar 33. If, for any reason, suction cannot be maintained in conduit 44, thus indicating that the workpiece 28 is either absent or refective, an alarm is actuated by a monitoring device connected with conduit 44 in a manner also described hereinafter with reference to FIG. 4.

When the supporting mechanism 35–42 has lifted the plate 32 out of the path of mold portion 11 and moves it toward the extreme right-hand position illustrated in dot-dash lines in FIG. 3, a stationary abutment 45 above plate 15 comes into contact with the cup-shaped article 28 and knocks it out of its collar 33. Before this occurs, however, a transfer member 46 (best seen in FIG. 2) has come in behind plate 32 in line with collar 33 so as to receive the article 28 therefrom. This transfer member, in the embodiment illustrated, comprises a stem 47 carrying a plurality of disks 48 with resilient peripheral fingers which defined a frustoconical surface similar to that of core 21. The fingers of disks 48 frictionally engage the cup 28 and carry it along a partly linear and party rotary path from the immediate vicinity of abutment 45 on the right (dot-dash lines, FIG. 2) into the open end of a stacking tube 49 (full lines, FIG. 2) which is formed with barbs 50 designed to strip each new cup 28 from its transfer member 46. The stem 47 of this member is, for this purpose, secured to a lever 51 pivoted on a vertical pin 52 which is journaled in a mounting plate 53 on mold portion 11; an extension 51a of lever 51 carries a stud 54 engaging in a camming slot 55 of a stationary bar 56, the slot 55 being so shaped that the cam follower 54 swings the arm 51 through an arc of 180° (clockwise, as indicated by an arrow B) in the initial phase of the closing stroke of mold portion 11. Stacking tube 49 is here shown as constituted by a plurality of angularly spaced horizontal strips which terminate in the barbs 50. These strips are mounted on mold-drive housing 18 by one or more brackets 57 and may lead to a removable container, not shown, for the finished articles 28.

It will be noted that the elements 11, 11a, 21, 25, 32 and 46 move all at the same linear speed, i.e. the speed of ram 19, during various parts of a cycle of the reciprocating mold portion. Naturally, the vacuum in conduit 44 must be cut off before the abutment 45 dislodges the article 28 from the collar 33, in order to prevent the giving of a false alarm.

Figure 4:
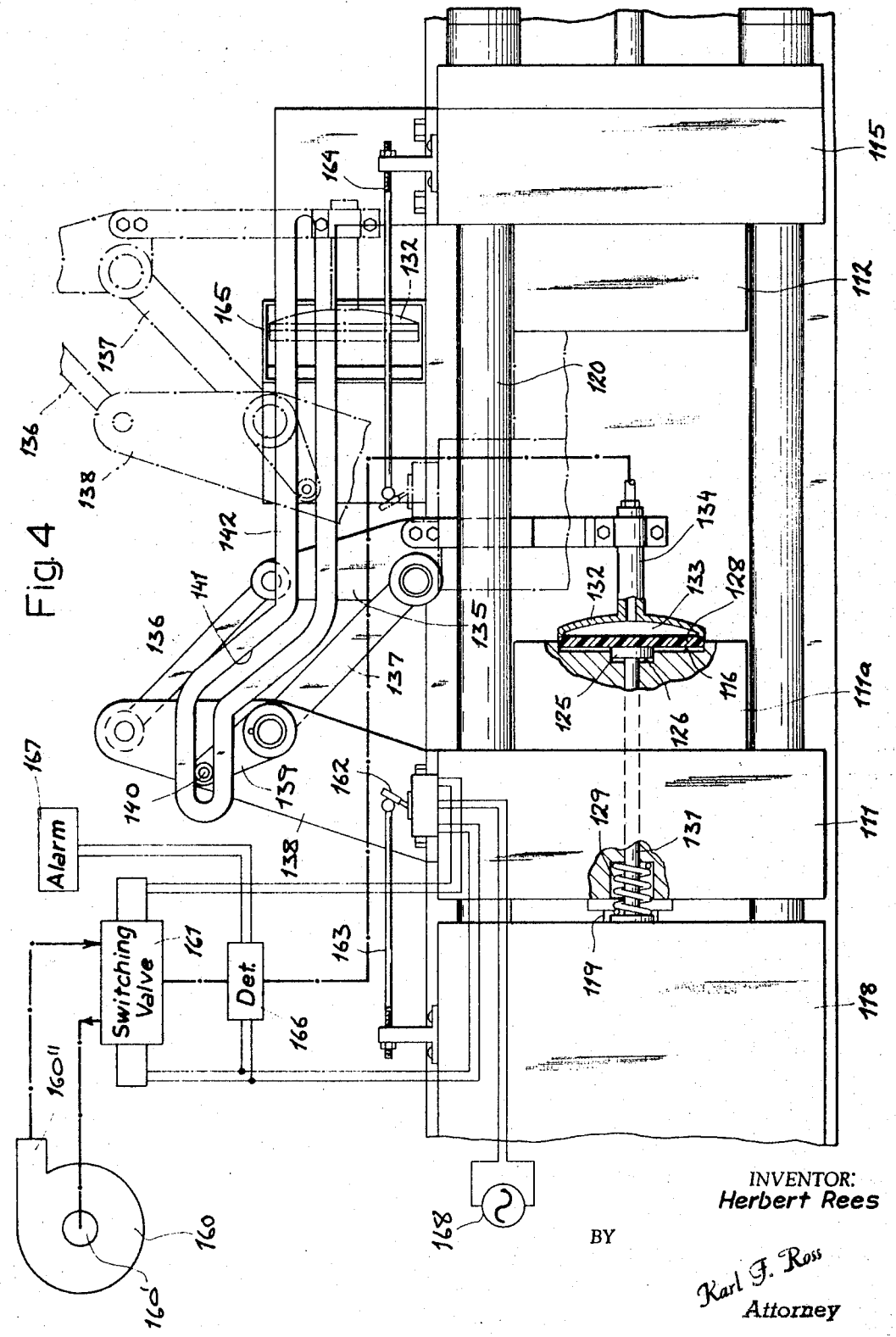
FIG. 4 is a view similar to FIG. 3, illustrating a modification.

In the system of FIG. 4, many elements are similar to those already described and have been designated by the same reference numerals preceded by a "1" in the position of the hundreds digit. This system is designed for the molding of flat, disk-shaped and solid articles 128 which do not require a core; extension 111A of reciprocable mold portion 111 has a recess 116 which together with stationary mold portion 112 defines a cavity for the articles 128. An ejection rod 131, rearwardly biased by a coil spring 129, terminates in a head 125 centrally positioned within a recess 126 of mold part 111a. In the terminal position shown in full lines, head 125 dislodges the article 128 from its cavity 116 and transfers it to a take-off plate 132 which is bowl-shaped and forms a vacuum chamber 133 communicating via a conduit 134 with a blower 160. A switching valve 161, controlled by a reversing switch 162 which is tripped by stops 163, 164 in the limiting positions of mold portion 111, alternately connects conduit 134 with the intake port 160′ (during the mold-closing stroke) and with the discharge port 160″ (during the mold-opening stroke) of blower 160. In the elevated terminal position of take-off plate 132 (dot-dash lines) the reversal of switch 152 and the consequent application of air pressure to workpiece 128 releases the latter from its seat and throws it into a chute 165 leading to a receptacle not shown. A low-pressure detector 166, deactivated by switch 162 during every mold-opening stroke, responds to failure of vacuum in conduit 134 during any mold-closing stroke to actuate an alarm 167; the triggering of this alarm, indicating absence or defective nature of a workpiece 128, may alert an operator or may directly stop the machine. An electric power supply for valve 161, detector 166 and alarm 167 has been shown at 168.

Naturally, take-off plates and transfer members adapted to accommodate more than one molded article at a time may also be used in a system of the type described. If suction tube 134 is omitted, friction may be relied upon to hold the workpieces in their seats on plate 32 or 132.

While a mechanical link beetweeen the movable support and the drive for the reciprocated mold portion has beeen described in connection with the preceding embodiments, it is also contemplated to use fluid-responsive means (e.g. a hydraulic or pneumatic cylinder) to effect the necessary motion and to employ electrical interlock means to ensure that the take-off plate has cleared the molding area. Such a fluid-operated system has been illustrated in the embodiments of FIGS. 5–8.

Figure 5:
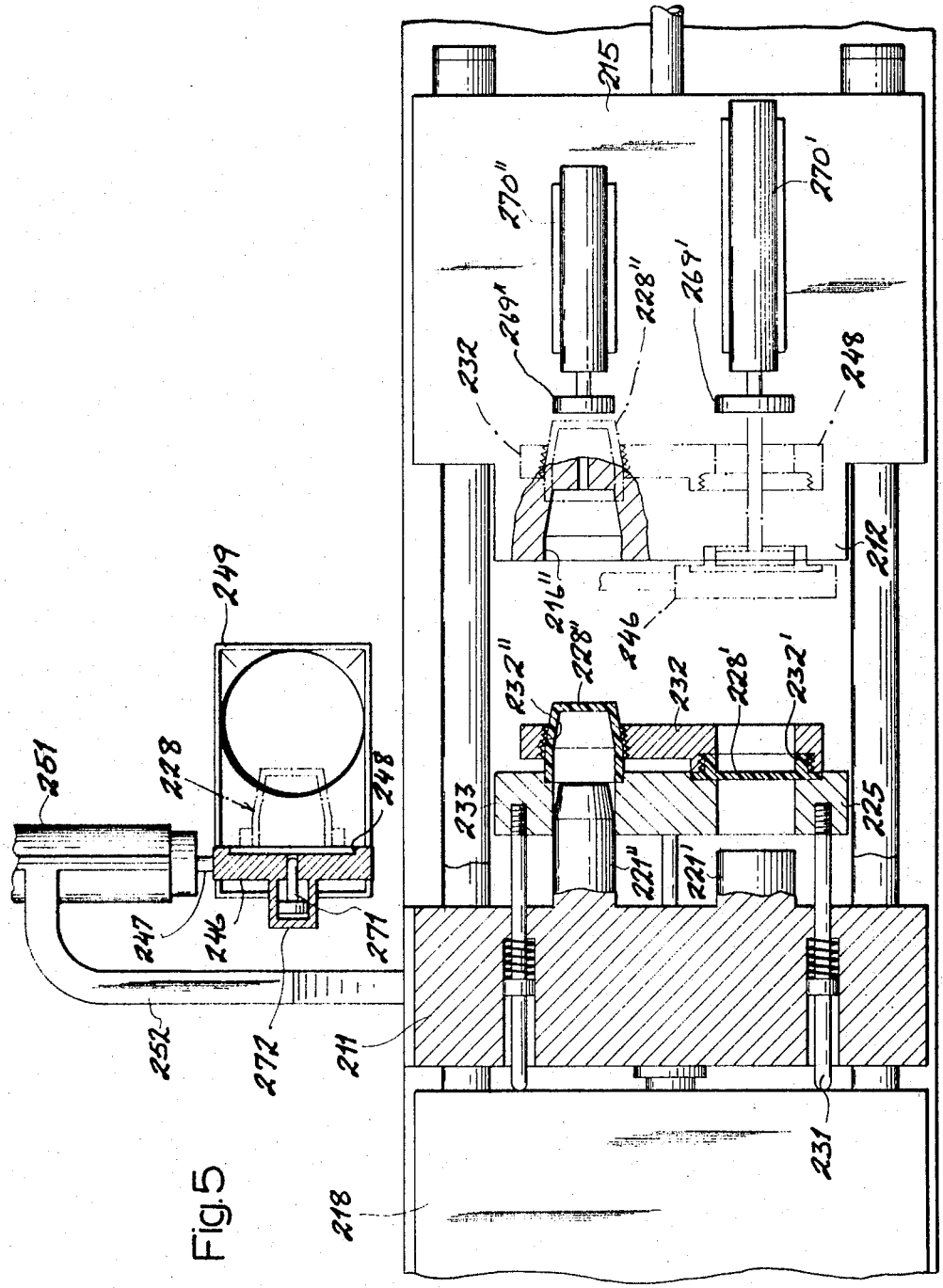
FIG. 5 is a view (parts broken away) similar to FIG. 2, showing an embodiment for the molding of two-part articles.
Figure 6:
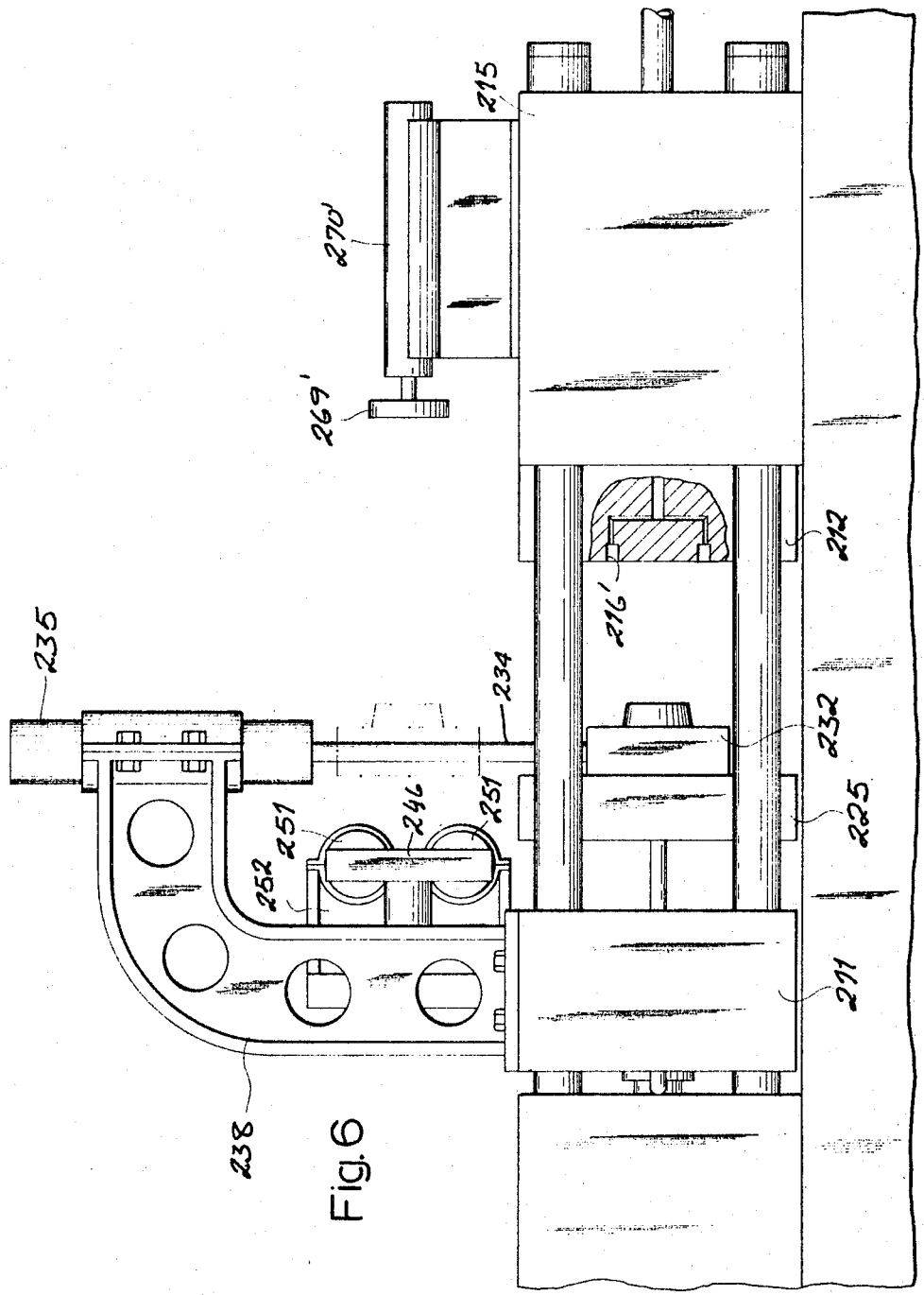
FIG. 6 is a side-elevational view (also partially broken away) of the machine shown in FIG. 5.

The injection-molding machine shown in FIGS. 5 and 6 is designed to produce an article 228 (e.g. a bottle stopper) composed of two separately molded parts 228′ and 228″. Part 228′, in the form of a circular base, and part 228″, i.e. a plug in the shape of a cup similar to workpiece 28 of FIGS. 2 and 3, may be made of different materials and/or in distinct colors. Thus, for example, base 228′ may consist of a brightly colored hard plastic, such as polystyrene, while plug 228″ may be of a softer transparent material, e.g., polyethylene. Mold portions 211 and 212, accordingly, define two separate cavities 216′, 216″ which are horizontally spaced and are simultaneously closed for the concurrent molding of the two parts. If several articles 228 are to be produced in each molding cycle, a corresponding number of cavities 216′ and a like number of cavities 216″ may be disposed in two parallel vertical rows on the mold portions.

A take-off plate 232, forming seats 232′, 232″ for the two workpieces 228′ and 228″, is suspended from a piston rod 234 whose piston, not shown, is vertically movable in a hydraulic cylinder 235 in synchronism with the reciprocation of the movable mold portion 211, as previously described, to withdraw the loaded take-off plate 232 in an upward direction when the mold is about to close. The admission of working fluid to the cylinder 235 is controlled, in a conventional manner not further illustrated, by timer-operated valves coupled with the mold drive. Cylinder 235 is supported via a standard 238 on mold portion 211 which is traversed by a pair of spring-loaded ejector rods 231 secured to a collar 233; as in the preceding embodiments, rods 231 strike an abutment surface of housing 218 in the terminal phase of the withdrawal stroke of mold portion 211 to detach the workpieces 228′, 228″ from their respective cores 221′, 221″ integral with mold portion 211.

A transfer member 246 in the shape of a flat plate, formed with a seat 248 for the article 228, is carried on two piston rods 247 (only one shown) projecting horizontally from a pair of hydraulic cylinders 251 which are also supported by means of a bracket 252 on the movable mold portion 211. Piston rods 247 are hydraulically actuated, in timed relationship with piston rod 234, to align the transfer plate 246 successively with the seats 232′, 232″ of the take-off plate 232 (dot-dash lines in FIG. 5) after the latter plate has been elevated into its retracted position illustrated in dot-dash lines in FIG. 6. This operative alignment of the two plates 232 and 246 takes place in the closed position of the injection mold 211, 212, i.e. during the formation of a new pair of parts 228′, 228″. The previously molded parts are confronted, in this elevated position of the take-off plate, by a pair of hydraulic plungers 269′, 269″ projecting horizontally from respective cylinders 270′, 270″ on backing plate 215 which may be considered an extension of stationary mold portion 212. Plungers 269′ and 269″ operate in step with the movement of transfer plate 246 so that, as illustrated in FIG. 5, plunger 269′ first knocks the part 228′ out of the take-off plate 232 and into the seat 248 of transfer plate 246; thereafter, following a horizontal displacement of transfer plate 246 to align the seat 248 with plunger 269″, the latter dislodges the part 228″ from the take-off plate and forces it into firm engagement with the previously seated part 228′ to complete the article 228. Finally, upon a removal of transfer plate 246 to a laterally offset discharging position illustrated in full lines in FIG. 5, another hydraulic plunger 271 in a cylinder 272 on plate 246 ejects the article 228 and lets it drop into a collection chute 249. This discharge takes place while the take-off plate 232 has again descended to pick up a new set of parts 228′, 228″.

Naturally, the seats 232′, 232″ of the take-off plate and 238 of the transfer plate should be duplicated in a vertical array if, as noted above, the mold portions 211 and 212 are provided with several sets of cavities for the simultaneous formation of two or more articles 228.

Figure 7:
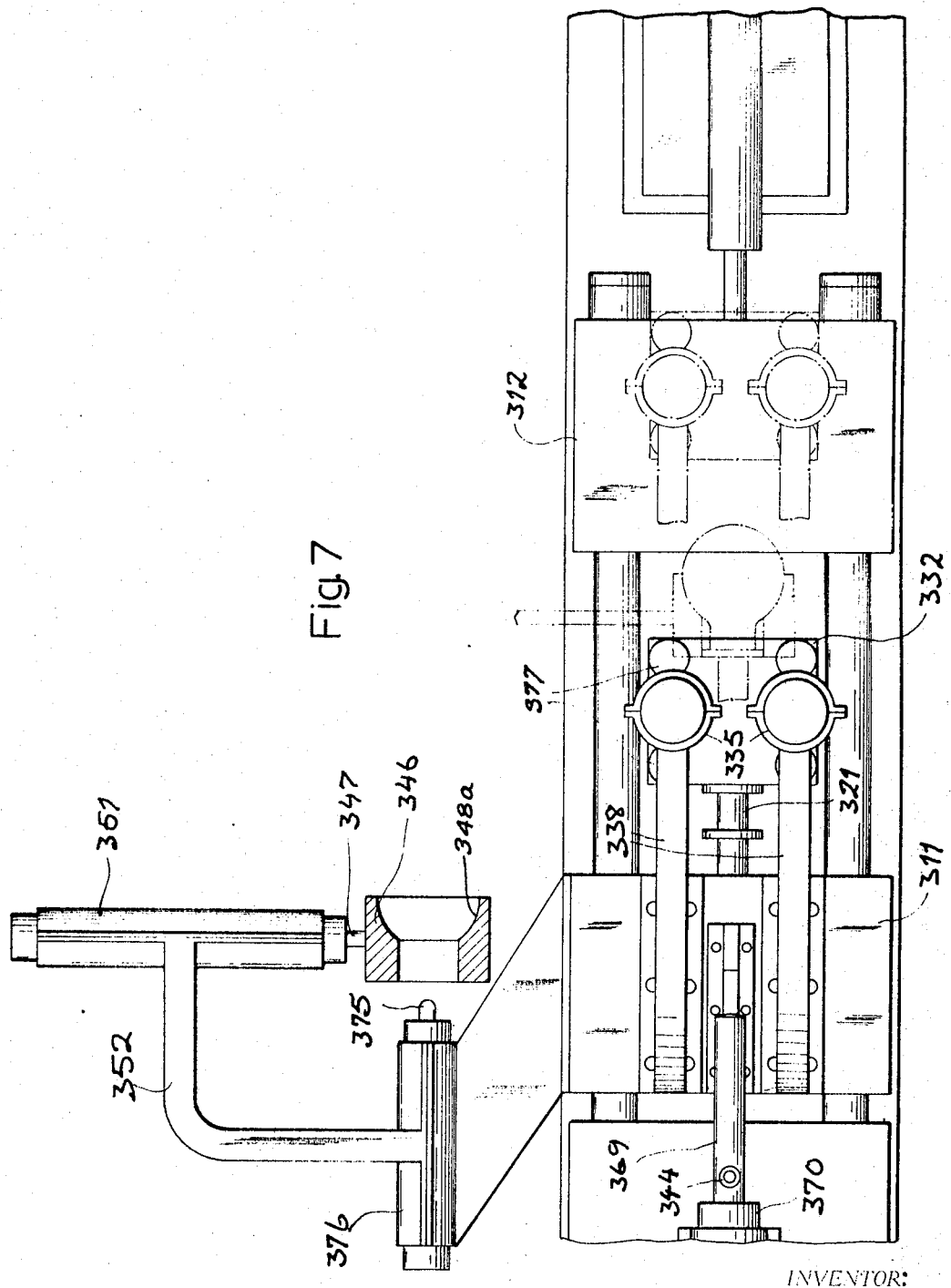
FIG. 7 is another view similar to FIG. 2, showing an embodiment provided with a blow-molding attachment.

The machine shown in FIGS. 7 and 8 has a take-off plate 332 whose two halves 332a, 332b constitute separable portions of a blow mold having a cavity 333. This cavity is substantially enlarged in comparison with a cavity 316 of stationary mold portion 312 wherein a preformed article or parison 328 is produced by injection. A core 321, slidably lodged in movable mold portion 311, also serves as a spring-loaded pusher element which ejects the parison 328 from mold portion 311 after the latter has been retracted sufficiently to let the rear end of core 321 strike the fixed housing portion 318. Core 321 is tubular and provided with an orifice 373 which during the molding step is blocked by a pin 374 fixedly secured to mold portion 311. Upon the retraction of that mold portion, orifice 373 is uncovered and communicates with a high-pressure line 360 leading to a source of fluid under pressure (arrow B in FIG. 8) such as the blower 160 of FIG. 4. The thimble-shaped parison 328, which at this time projects well into the cavity 333 of take-off plate 332, is thereby inflated against the walls of that cavity so as to form the finished flask-shaped article 328x. Next, take-off plate 333 is hydraulically withdrawn by a pair of piston rods 334 (only one shown) actuated, as in the preceding embodiment, by fluid in cylinders 335 which are carried by supports 338 rising from mold plate 311. Meanwhile, a transfer plate 346 also supported on mold plate 311 through the intermediary of a bracket 352, a hydraulic cylinder 351 and a horizontally movable piston rod 347 have moved in behind take-off plate 332 and into line with a plunger 369 which is axially movable in a hydraulic cylinder 370, this cylinder being in turn mounted on mold portion 311 between the standards 338 supporting the cylinders 335. Plunger 369 is tubular and connected to a suction line 344 designed to create a partial vacuum in tube 369 after the latter has been introduced into the article 328x within blow mold 332a, 332b through an opening 348 of plate 346 which forms a seat 348a for the article. As described in connection with FIG. 4, this line 344 may also lead to an alarm device to indicate the absence of a molded article in cavity 333. If this article is present, the suction of tube 369 removes it from the take-off plate 332, whose halves 332a, 332b are opened (dot-dash lines in FIG. 8) by a set of hydraulic pistons 377, and lodges the article in the seat 348a of transfer plate 346. Finally, after the take-off plate 332 has descended once more and the transfer plate 346 has moved laterally outwardly into a discharge position, another hydraulic plunger 375 in a cylinder 376, also carried by mold portion 311, operates to eject the article 328x from the transfer plate 348 into a receptacle not shown; at the same time, a new parison is introduced into the lowered take-off plate 332 and is inflated to form another article 328x.

I claim:

1. In an injection-molding machine having two relatively movable mold portions which define at least one cavity provided with inlet means for admitting a hardenable plastic material to form at least one molded article, the combination therewith of a take-off member reciprocably mounted for interposition between said mold portions in an open condition thereof and provided with holding means for receiving said molded article from said mold portions, drive means for moving said take-off member in synchronism with said mold plates for entrainment of said molded article from the region of said mold portions preparatorily to reclosure thereof and performance of a new molding operation, a transfer member coupled with said drive means for alignment with said take-off member in a retracted position thereof and displacement into a discharge position adjacent a receptacle for molded articles concurrently with a return of said take-off member to the region between said mold portions, and unloading means for transferring said article from said take-off member to said transfer member in the aligned position thereof and for directing said article into said receptacle in said discharge position.

2. The combination defined in claim 1 wherein said mold portions include a stationary mold portion and an axially reciprocable mold portion, said members being supported on said reciprocable mold portion for axial displacement therewith.

3. The combination defined in claim 2 wherein said take-off member is mounted for generally upward motion from the region of said mold portions to said retracted position, said transfer member being movable in a substantially horizontal plane on the level of said retracted position.

4. The combination defined in claim 1 wherein said mold portions define at least two cavities of different shape for the molding of complementary parts to be assembled to a finished article, said holding means forming at least two seats staggered in the direction of movement of said transfer member relative to the retracted take-off member for respectively receiving said complementary parts, said transfer member being successively positionable by said drive means in line with said seats for receiving first one of said complementary parts and thereafter the other complementary part, said unloading means being operable to force said other part into firm engagement with said one part.

5. The combination defined in claim 4 wherein said mold portions include an axially reciprocable mold portion supporting said members and a stationary mold portion supporting said unloading means.

6. The combination defined in claim 1 wherein said holding means forms a blow mold on said take-off member for an article preformed in said cavity, one of said mold portions being provided with tubular pusher means connected to a source of fluid under pressure and positioned to extend into the preformed article upon its engagement with said holder means for admitting said fluid into the article and expanding same against the walls of said blow mold, said transfer member having an opening to receive the blow-molded article from said take-off member, said unloading means being introduceable through said opening into said blow mold in the aligned position of said members for withdrawing the article from said blow mold into said opening.

7. The combination defined in claim 6 wherein said unloading means comprises a suction tube.

8. The combination defined in claim 6 wherein the mold portion provided with said pusher means is axially reciprocable, said pusher means being displaceably mounted on said reciprocable mold portion for engagement by a stationary abutment during the opening stroke of said reciprocable mold portion.

9. The combination defined in claim 1 wherein said holding means forms a seat for the molded article including a suction chamber communicating with a conduit leading to a source of low pressure, the latter being coupled with said drive means for actuation in step with the molding cycle to hold said molded article in said seat during entrainment by said take-off member.

10. The combination defined in claim 9, further comprising alarm means operatively connected with said suction chamber and conditionable by said drive means for indicating the absence of an article from said seat during the entrainment phase.

11. The combination defined in claim 9 wherein said mechanism further includes valve means for switching said conduit to a source of high pressure to dislodge the entrained article from said seat.

References Cited

UNITED STATES PATENTS

| 3,070,843 | 1/1963 | Jurgeleit | 18—2 |
| 3,205,291 | 9/1965 | Derror | 18—2 |
| 3,270,379 | 9/1966 | Sehn et al. | 164—344 |

WILBUR L. McBAY, Primary Examiner

U.S. Cl. X.R.

18—2, 5; 164—344